(12) United States Patent
Hrachová et al.

(10) Patent No.: US 10,233,316 B2
(45) Date of Patent: Mar. 19, 2019

(54) THERMOPLASTIC COMPOSITION AND ARTICLE

(71) Applicant: SABIC GLOBAL TECHNOLOGIES B.V., Bergen op Zoom (NL)

(72) Inventors: Jana Hrachová, Geleen (NL); Franciscus Elisabeth Jacobus Essers, Maastricht (NL)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 29 days.

(21) Appl. No.: 15/565,911

(22) PCT Filed: Apr. 12, 2016

(86) PCT No.: PCT/EP2016/057954
§ 371 (c)(1),
(2) Date: Oct. 12, 2017

(87) PCT Pub. No.: WO2016/166072
PCT Pub. Date: Oct. 20, 2016

(65) Prior Publication Data
US 2018/0094128 A1    Apr. 5, 2018

(30) Foreign Application Priority Data

Apr. 13, 2015   (EP) .................................. 15163330

(51) Int. Cl.
| | |
|---|---|
| *C08L 23/08* | (2006.01) |
| *C08L 23/12* | (2006.01) |
| *C08L 23/16* | (2006.01) |
| *C08K 7/14* | (2006.01) |
| *C08J 3/11* | (2006.01) |
| *B29L 31/30* | (2006.01) |

(52) U.S. Cl.
CPC ............ *C08L 23/0815* (2013.01); *C08J 3/11* (2013.01); *C08K 7/14* (2013.01); *C08L 23/12* (2013.01); *C08L 23/16* (2013.01); *B29L 2031/3008* (2013.01); *B29L 2031/3041* (2013.01); *C08F 2500/12* (2013.01); *C08F 2500/21* (2013.01); *C08F 2800/20* (2013.01)

(58) Field of Classification Search
CPC ...... C08L 9/06; C08L 1/0016; C08L 2205/02; C08L 2205/06; C08K 5/44; C08K 5/548
See application file for complete search history.

(56) References Cited

U.S. PATENT DOCUMENTS

| | | | |
|---|---|---|---|
| 2002/0107328 A1 | 8/2002 | Laughner et al. | |
| 2004/0249080 A1 | 12/2004 | Shankernarayanan et al. | |
| 2011/0097577 A1* | 4/2011 | Soliman et al. | ......... C08K 5/20 |
| | | | 428/339 |
| 2012/0190784 A1* | 7/2012 | Posch et al. | .......... C08F 210/06 |
| | | | 524/427 |

FOREIGN PATENT DOCUMENTS

| | | |
|---|---|---|
| EP | 2108665 A1 | 10/2009 |
| WO | 2007025663 A1 | 3/2007 |
| WO | 2009047188 A1 | 4/2009 |
| WO | 2015028955 A1 | 3/2015 |

OTHER PUBLICATIONS

Cheng, "C NMR Analysis of Ethylene-Propylene Rubbers," Macromolecules 1984, 17, 1950-1955.
Hirano et al., "Morphological Analysis of the Tiger Stripe on Injection Molding of Polypropylene/Ethylene-Propylene Rubber/Talc Blends Dependent on Based Polypropylene Design," J. Applied Polym. Sci. vol. 104, 192-199 (2007).
Hirano et al., "Striped-Pattern Deterioration and Morphological Analysis of Injection Molding Comprising Polypropylene/Ethylene-α-Olefin Rubber Blends. II. Influence of Heating," Journal of Applied Polymer Science, vol. 108, pp. 76-84 (2008).
International Search Report for International Application No. PCT/EP2016/057954; International Filing Date: Apr. 12, 2016; dated May 25, 2016; 3 Pages.
Written Opinion for International Application No. PCT/EP2016/057954; International Filing Date: Apr. 12, 2016; dated May 25, 2016; 4 Pages.

* cited by examiner

*Primary Examiner* — Nathan M Nutter
(74) *Attorney, Agent, or Firm* — Cantor Colburn LLP

(57) ABSTRACT

The invention is directed to a thermoplastic composition and to an article made from said thermoplastic composition. More in particular, the invention relates to blended polyolefinic materials, which, after molding, provide a soft touch feel. The thermoplastic composition of the invention comprises (A) 10-40% by total weight of the composition of glass fibers; (B) 22-46% by total weight of the composition of a propylene homopolymer matrix phase; (C) 1.5-26% by total weight of the composition of an ethylene-propylene copolymer dispersed phase; and (D) 11-46% by total weight of the composition of a mixture of elastomers, said mixture comprising an ethylene/$C_{5-8}$ α-olefin copolymer and an ethylene/$C_{3-4}$ α-olefin copolymer.

17 Claims, No Drawings

THERMOPLASTIC COMPOSITION AND ARTICLE

CROSS REFERENCE TO RELATED APPLICATIONS

This application is a 371 of International Application No. PCT/EP2016/057954, filed Apr. 12, 2016, which claims priority to European Application No. 15163330.2 filed Apr. 13, 2015 which are incorporated herein by reference in their entirety.

The invention is directed to a thermoplastic composition and to an article made from said thermoplastic composition. More in particular, the invention relates to blended polyolefinic materials, which, after moulding, provide a soft touch feel.

For the purpose of this application, "soft touch feel" is a property of the mouldings which can be described as a softness perceived as pleasant on contact of the human hand with the surface of the mouldings. "Soft touch feel" is typically qualitatively determined via a panel, for example composed of five persons of which at least three have to assess the contacted surface as having typical "soft touch feel" in comparison with an internal sample catalogue composed of five different surfaces with and without "soft touch feel".

Soft touch materials have found applications in many industries. For example, soft touch materials can be utilised in automotive interior components such as trim components, grips on steering wheels, and shifters. Electronic industries also utilise soft touch materials on the grips and protective coverings of handheld electronic devices. Other applications can vary, for example soft touch material can be found in tool handles and tooth brushes.

One way to impart a soft touch feel is to use a multistep process applying a secondary layer of functional material on top of a moulded article through over-moulding, painting, or other techniques. Another way to impart a soft touch feel is to provide a polymeric composition, particularly, a polyolefin composition that can exhibit a relatively soft touch feel. Such a composition desirably also has one or more of low gloss, good impact properties, good flexural properties, good tensile properties, good scratch resistance, and practical hardness values.

Thermoplastic polymeric compositions which, after moulding, provide a soft touch feel are known in the art.

For example, US-A-2002/0 107 328 describes thermoplastic polyolefin compositions yielding articles with a soft touch feel that comprise a propylene homopolymer or copolymer and a homogeneously branched ethylene/α-olefin copolymer in which the α-olefin contains at least 4 carbon atoms and the homogeneously branched copolymer has a crystallinity of less than about 3 percent.

US-A-2004/0 249 080 discloses soft touch thermoplastic olefin compositions that comprise a polypropylene-ethylene copolymer and a cross-linked or uncross-linked ethylene-propylene thermoplastic elastomer in an amount sufficient to provide the composition with a 1% flexural secant modulus from about 10 000-80 000 psi.

WO-A-2009/047188 discloses propylene polymer compositions that, after moulding, give a soft touch feel and which comprise at least 35 wt. % of a polypropylene, not more than 50.0 wt. % of an elastomeric copolymer of ethylene and a $C_{3-8}$ α-olefin, and at least 10.0 wt. % of an ethylene $C_{2-8}$ alkyl acrylate copolymer, wherein the composition has a gel content of 0.25-1.00 wt. % determined as the xylene hot insoluble fraction.

WO-A-2007/025663 describes polymeric moulding compositions that yield articles with pleasant soft-touch feel that comprise at least a combination of 5-90% by weight of soft material with 5-60% by weight of glass material as filler and with 3-70% by weight of a thermoplastic polymer.

WO-A-2015/028955 discloses olefinic compositions that yield articles wherein desirable soft touch feel properties are combined with good mechanical properties. These soft touch compositions comprise, based on the total weight of the composition, 10-40 wt. % of glass fibres, and 50-88 wt. % of a polymer comprising, based on the total weight of the polymer, 44-52 wt. % of a polypropylene homopolymer, 3-30 wt. % of an ethylene-propylene copolymer, and 22-52 wt. % of an ethylene-$C_4$ to $C_8$ α-olefin copolymer.

The inventors found, however, that in particular the optical surface properties of articles made from the olefinic compositions, such as disclosed in WO-A-2015/028955, can be improved. In particular, articles made from the olefinic compositions disclosed in WO-A-2015/028955 suffer from so-called tiger stripes. The term "tiger stripes" as used in this application is meant to refer to colour and gloss variations on the surface of an injection moulded article, which occur because of unstable mould fillings properties of the molten polymer as it is being injected into the mould and formed into the desired shape. Usually these variations can be observed as alternating areas of low and high gloss and/or light or darker colour, wherein the areas usually are substantially perpendicular to the flow direction of an injection moulded article. Tiger stripes may also be referred to as tiger marks or tiger (flow) marking or flow marks. Examples of such appearance and a more scientific discussion on the cause of tiger stripes may be found in Hirano et al., *Journal of Applied Polymer Science* 2007, 104 (1), 192-199 and in Hirano et al., *Journal of Applied Polymer Science* 2008, 108 (1), 76-84, the contents of which are herewith completely incorporated by reference.

Accordingly, there is a need in the art for thermoplastic compositions with which articles can be made that have a soft touch feel and excellent optical surface properties, in particular a lack of substantial tiger stripes. Objective of the invention is to address this need in the art and overcome drawbacks in the prior art. A further objective of the invention is to provide a thermoplastic composition that yields articles combining a soft touch feel with excellent optical surface properties and further have desirable mechanical properties.

The inventors surprisingly found that this objective can, at least in part, be met by a polypropylene composition that comprises a specific combination of elastomers.

Accordingly, in a first aspect the invention is directed to a thermoplastic composition comprising:
(A) 10-40% by total weight of the composition of glass fibres;
(B) 22-46% by total weight of the composition of a propylene homopolymer matrix phase;
(C) 1.5-26% by total weight of the composition of an ethylene-propylene copolymer dispersed phase; and
(D) 11-46% by total weight of the composition of a mixture of elastomers, said mixture comprising an ethylene/$C_{5-8}$ α-olefin copolymer and an ethylene/$C_{3-4}$ α-olefin copolymer.

The inventors surprisingly found that the thermoplastic composition of the invention in which a specific mixture of elastomers is used yields articles with significantly less tiger stripes. Moreover, it was found that the mixture of elastomers additionally give rise to articles with improved soft touch feel properties.

The thermoplastic composition of the invention comprises glass fibres. The glass fibres, as added to the composition, can comprise long and/or short glass fibres. Compositions filled with short glass fibres can be made by mixing chopped strands of pre-determined length with a thermoplastic polymer in an extruder, during which the glass fibres are dispersed in the molten thermoplastic. Compositions filled with long glass fibres can be made by a cable-wiring process or by a pultrusion process. The length of the added glass fibres can decrease during processing and as such the final length of the glass fibres in the composition and, in particular after compounding, can be less than that of the added glass fibres. Long glass fibres can have an average fibre length, before compounding, of 1 mm or more. Preferably, the long glass fibres can have an average fibre length, before compounding, of 1-50 mm, more preferably 1-20 mm, and even more preferably 5-15 mm. Short glass fibres can have an average fibre length, before compounding, of 1-10 mm, preferably 2-8 mm, more preferably 3-7 mm.

The diameter of the glass fibres, before compounding, can be 5-50 μm, preferably 8-30 μm, more preferably 10-20 μm.

The aspect ratio of the fibres can be in the range of 200-2000, preferably in the range of 200-1000, such as in the range of 250-750. The aspect ratio refers to the ratio between the average fibre length and the average fibre diameter.

Generally, the length of glass fibres in a polymer composition decreases during a melt processing step like injection moulding. The average length of the glass fibres in a moulded article made from the composition according to the invention, i.e. after compounding, is therefore typically significantly shorter. Typically, after compounding, the glass fibres have an average fibre length of 1 mm or less. Preferably, the average fibre length in a moulded article (after compounding) can be from 0.05-0.9 mm, more preferably 0.1-0.6 mm, even more preferably 0.1-0.4 mm.

Since the average glass fibre diameter does not substantially change upon compounding, the average glass fibre diameter in a moulded article made from the composition according to the invention, i.e. after compounding, can be in the range of 5-50 μm, preferably 8-30 μm, such as 10-20 μm.

Suitably, the glass fibres can be coated in order to improve the interaction with the polypropylene. Such coated glass fibres are also known in the art as sized glass fibres. Such coatings typically include amino-silane or silane coatings. Amino-silane and silane coated glass fibres are commercially available. Some examples include ECS03-480H (from NEG), 03T480 (from NEG), HP3270 (from PPG Industries), HP3299 (from PPG Industries), ECS 305H (from CPIC), ECS 305K (from CPIC), DS2100-13P (from Binani 3B fibreglass), DS2200-10P (from Binani 3B fibreglass), and DS2200-13P (from Binani 3B fibreglass).

The glass fibres may be treated with a coupling agent so as to improve the interaction between the glass fibres and the polypropylene. Such coupling agents facilitate adhesion of the polypropylene to the polar glass fibre surface. Suitable coupling agents include functional organo-silanes, transition metal coupling agents, amino-containing Werner coupling agents and mixtures thereof. Examples of functional organo-silane coupling agents include 3-aminopropyldimethylethoxysilane, γ-aminopropyltriethoxysilane, γ-aminopropyltrimethoxysilane, β-aminoethyltriethoxysilane, N-β-aminoethylamino-propyltrimethoxysilane, γ-isocyanatopropyltriethoxysilane, vinyl-trimethoxysilane, vinyl-triethoxysilane, allyl-trimethoxysilane, mercaptopropyltrimethoxysilane, mercaptopropyltriethoxysilane, glycidoxypropyltriethoxysilane, glycidoxypropyltrimethoxysilane, 4,5-epoxycyclohexyl-ethyltrimethoxysilane, ureidopropyltrimethoxysilane, ureidopropyltriethoxysilane, chloropropyltrimethoxysilane, and chloropropyltriethoxysilane. Examples of transition metal coupling agents include chrome, titanium and zirconium coupling agents. Examples of amino-containing Werner type coupling agents include complex compounds in which a trivalent nuclear atom such as chromium is coordinated with an organic acid having amino functionality. Such treated glass fibres are known in the art.

The amount of glass fibres (A) in the thermoplastic composition of the invention can vary depending on the specific application and needs. For example, the amount of glass fibres in the thermoplastic composition may be 20-30% by total weight of the composition, such as 20-25%.

The glass fibre can be prepared from continuous lengths of fibres by, for example, a sheathing or wire-coating process, by crosshead extrusion, or by a pultrusion technique. Using these technologies, fibres strands impregnated or coated with a polymer are formed. The fibre can then be cut into a desired length and can optionally be formed into pellets or granules. The fibres can be further processed, e.g., by injection moulding or extrusion processes, into a composition.

The propylene homopolymer matrix phase in the thermoplastic composition of the invention can have a melt flow index of 5-150 g/10 min, preferably 10-150 g/10 min, more preferably 10-70 g/10 min, as measured at 230° C. under 2.16 kg force according to ISO 1133.

The amount of propylene homopolymer matrix phase (B) in the thermoplastic composition of the invention may be 23-44% by total weight of the composition, such as 24-43% by total weight of the composition.

The ethylene-propylene copolymer dispersed phase can be a random or block copolymer. The copolymer is derived from at least propylene and ethylene. The ethylene-propylene copolymer can comprise 55-95% by total weight of the ethylene-propylene copolymer of polypropylene, such as 80-95%. The ethylene-propylene copolymer can comprise 5-45% by total weight of the ethylene-propylene copolymer of ethylene, such as 5-20%. The ethylene content may be determined using $^{13}C$ NMR as described by Cheng, *Macromolecules* 1984, 17 (10), 1950-1955, the content of which is herewith completely incorporated by reference.

A cold xylene soluble fraction of the ethylene-propylene copolymer dispersed phase can have an intrinsic viscosity of 2-8 dl/g, preferably 2.5-6.5 dl/g as measured in decalin at 135° C. A cold xylene soluble fraction of the ethylene-propylene copolymer can have an intrinsic viscosity of 3 dl/g or more, such as 4 dl/g or more, as measured in decalin at 135° C. The extraction of cold xylene soluble fraction is performed at 25° C. according to ISO 16152.

The amount of ethylene-propylene copolymer dispersed phase (C) in the thermoplastic composition of the invention may be 3-18% by total weight of the composition, such as 5-13%.

The propylene homopolymer matrix phase (B) and the ethylene-propylene copolymer dispersed phase (C) can suitably be in the form of a heterophasic system comprising the two respective phases, for example, a crystalline propylene homopolymer-based matrix and a dispersed ethylene-propylene elastomeric phase. Suitably, the components (B) and (C) together are composed of one or more heterophasic polypropylene copolymers. Such a heterophasic systems are also known as impact copolymers and can be prepared in one or more reactors, by polymerisation of, for example, propylene in the presence of a catalyst, and subsequent polymerisation of a propylene-ethylene mixture. It is, however, also possible to prepare such a heterophasic system by blending the propylene homopolymer and the ethylene-propylene copolymer components. The specific morphology of the resulting heterophasic system is dependent upon the preparation method and the monomers from which the polymers were derived and their relative amounts.

The heterophasic system can comprise 20% or more by total weight of the heterophasic system (i.e. components (B)+(C) together) of propylene homopolymer matrix phase, preferably 50-95%. The heterophasic system can comprise 5-50% by total weight of the heterophasic system (i.e. components (B)+(C) together) of ethylene-propylene copolymer dispersed phase, preferably 10-50%, more preferably 15-35%, and even more preferably 20-35%, such as 17-25%.

The melt flow index of the heterophasic system (as measured at 230° C. under 2.16 kg force according to ISO 1133) can be 1-100 g/10 min, for example, 10-40 g/10 min. The melt flow index of the heterophasic system can be 65 g/10 min or less, preferably 1-65 g/10 min.

A cold xylene soluble fraction of the heterophasic system can have an intrinsic viscosity of 1.5-6 dl/g, preferably 3-6 dl/g, as measured in decalin at 135° C. A cold xylene insoluble fraction of the heterophasic system can have an intrinsic viscosity of 1-3 dl/g, as measured in decalin at 135° C. The extraction of the cold xylene soluble fraction and the cold xylene insoluble fraction is performed at 25° C. according to ISO 16152.

The thermoplastic composition of the invention further comprises a mixture of elastomers, wherein the mixture comprises an ethylene/$C_{5-8}$ α-olefin copolymer and an ethylene/$C_{3-4}$ α-olefin copolymer. Suitably, the elastomers in the mixture (D) are different from the ethylene-propylene copolymer dispersed phase.

The elastomers in the mixture (D) can be random or block copolymers and may be derived from ethylene and the corresponding α-olefin.

The ethylene/$C_{5-8}$ α-olefin copolymer may be derived from ethylene and one or more $C_{6-8}$ α-olefins, preferably from ethylene and one or more $C_{6-8}$ α-olefins, and more preferably from ethylene and one or more $C_{7-8}$ α-olefins. Examples of suitable $C_{5-8}$ α-olefins include 1-pentene, 4-methyl-1-pentene, 1-hexene, 1-heptene, and 1-octene, among which 1-octene is particularly preferred. The ethylene content of the copolymer can vary widely and may, for example, be 40-80% by total weight of the copolymer, preferably 50-75%, such as 60-75%.

The ethylene/$C_{3-4}$ α-olefin copolymer may be derived from ethylene and one or more $C_{3-4}$ α-olefins. Suitable $C_{3-4}$ α-olefins include 1-propene, 1-butene, among which 1-butene is particularly preferred. The ethylene content of the copolymer can vary widely and may, for example, be 40-80% by total weight of the copolymer, preferably 50-75%, such as 60-75%.

In a preferred embodiment, the ethylene/$C_{5-8}$ α-olefin copolymer is a copolymer of ethylene and 1-octene and the ethylene/$C_{3-4}$ α-olefin copolymer is a copolymer of ethylene and 1-butene.

The ethylene/$C_{5-8}$ α-olefin copolymer and the ethylene/$C_{3-4}$ α-olefin copolymer are preferably present in a weight ratio of 5:1 to 1:1, preferably in a weight ratio of 3:1 to 1:1, more preferably in a weight ratio of 2:1 to 1:1, and even more preferably in a weight ratio of 1.5:1 to 1:1. In increase of the relative mount of the ethylene/$C_{3-4}$ α-olefin copolymer in the mixture of elastomers was found to have an additional positive effect on the soft touch feel and tiger stripe properties of a moulded article prepared from the thermoplastic composition.

The elastomers in the mixture can have a density of 850-880 kg/m³. The melt flow index of the elastomers in the mixture can be 0.5-35 g/10 min, preferably 1-30 g/10 min, more preferably 2-10 g/10 min, even more preferably 4-6 g/10 min, as measured at 190° C. under 2.16 kg force according to ISO 1133.

The amount of the mixture of elastomers (D) in the thermoplastic composition of the invention may be 14-40% by total weight of the composition, such as 17-35%.

In a preferred embodiment, the thermoplastic composition further comprises (E) a heterophasic polypropylene copolymer having a melt flow index of 50 g/10 min or more as measured at 190° C. under 2.16 kg force according to ISO 1133, preferably 55 g/10 min or more, more preferably 60 g/10 min or more. The use of ethylene/$C_{3-4}$ α-olefin copolymer in the mixture of elastomers lowers the melt flow index of the thermoplastic composition which, for some applications such as injection moulding, may be undesirable. Therefore, it may be advantageous for such applications to include a heterophasic polypropylene copolymer having a relatively high melt flow index so as to increase the overall melt flow index of the thermoplastic composition.

Suitably, the heterophasic polypropylene copolymer (E) is different from the possible heterophasic polypropylene copolymer forming components (B) and (C).

The amount of the heterophasic polypropylene copolymer (E) in the thermoplastic composition of the invention may be 0-15% by total weight of the composition, such as 2-12%, or 3-10%.

The thermoplastic composition can further comprise (F) a modified polypropylene that can result in improved properties by affecting glass fibre-polypropylene interactions. Examples of suitable modified polypropylenes are polypropylenes grafted with, for example, an unsaturated organic compound, such as a carboxylic acid, an anhydride, an ester, or salts thereof. Suitable examples include maleic, fumaric, (meth)acrylic, itaconic or cinnamic acid or anhydride, ester or salt thereof, among which maleic anhydride is preferred. The grafted groups can be present in an amount of 0.5% or more by total weight of the modified polypropylene, preferably 0.7% or more. The density of the modified polypropylene can be 800-1000 kg/m³, for example about 900 kg/m³. The melt flow index of the modified polypropylene (as measured at 230° C. under 2.16 kg force according to ISO 1133) can be 25 g/10 min or more, for example 100 g/10 min or more. The modified polypropylene can be produced by reactive extrusion. As used in this application, the term "modified polypropylene" comprises modified propylene homopolymer, for example, maleic anhydride functionalised propylene homopolymer produced by reactive extrusion.

The amount of modified polypropylene in the thermoplastic composition of the invention can vary widely, but for economical reasons the amount normally will be rather low, for example 0-5% by total weight of the composition, preferably 0.1-4%, such as 0.1-3%, 0.1-2%, or even 0.1-1%.

The thermoplastic composition of the invention can further comprise (G) silicone particles. The silicone particles can be, for example, spherical, oblong, ovoidal, cylindrical, or any combination thereof. Preferably, the silicone particles are essentially spherical in shape. The silicone particles can have a mean bead diameter of 1.8-10.5 µm, preferably 2-10 µm, more preferably 5-7 µm. The bulk specific gravity of the silicone particles is typically 0.35-0.67 kg/l. The addition of the silicone particles can result in an improvement in the haptic properties as compared to a composition without said particles.

Silicone particles comprise a three-dimensional polymer chain of the formula (I):

$$R_xSiO_{2-(x/2)} \quad (I)$$

wherein
x is a positive number greater than or equal to 1, preferably 1-1.9, more preferably 1-1.5, and even more preferably 1-1.2, and
each R is independently an organic group, such as an aliphatic hydrocarbon group (e.g. methyl, ethyl, propyl or butyl) or an aromatic hydrocarbon (e.g. phenyl), and can comprise an unsaturated group (e.g. vinyl).

In exemplary embodiments, R is a hydrocarbon group having 1-8 carbon atoms, preferably 1-5 carbon atoms, more preferably methyl. Specifically mentioned silicon resin particles comprise methylsilsesquioxane.

Suitable silicone particles are commercially available from Momentive Performance Materials Japan LLC, under the name of "Tospearl" silicone resin particles. These particles have a three-dimensional network structure in which each silicone atom is bonded to one methyl group.

The amount of silicone particles (G) in the thermoplastic composition of the invention may be 0.5-5% by total weight of the composition, such as 0.7-4%.

As a further component, the thermoplastic composition can comprise (H) a polysiloxane, which may function as a processing aid. The polysiloxane can comprise an ultrahigh molecular weight polysiloxane with a kinematic viscosity of $10 \times 10^6$ cSt or more as determined in accordance with ASTM D445 at 25° C. The polysiloxane can be added to the composition as a polymer dispersion, where the polysiloxane is dispersed in a polymer matrix, for example, in polypropylene. The polypropylene matrix can comprise the above mentioned polypropylene. Preferably, the polypropylene matrix can comprise a propylene homopolymer. The siloxane content of the dispersion can be 40-60% by total weight of the dispersion, such as about 50%. As used herein, the term "siloxane" is meant to comprise polydimethyl siloxane and functionalised polydimethyl siloxane. An example of such a polysiloxane processing aid is MB50-001 Masterbatch, commercially available from Dow Corning™.

The processing aid can be present in an amount of 0.2-10% by total weight of the composition, preferably 0.2-5%, more preferably 0.2-1%, such as 0.2-0.5%.

The thermoplastic composition may further comprise (I) a fatty acid amide, such as oleamide and/or erucamide. Oleamide and erucamide are the amides of the fatty acids oleic acid and erucic acid, and have molecular formula $C_{18}H_{35}NO$ and $C_{22}H_{43}NO$, respectively. Such an amount of fatty acid amide can decrease the visibility of surface damage like scratches on a moulded article. Accordingly, the amount of fatty acid amide can be 1% or less by total weight of the composition, such as 0.1-1%, preferably 0.1-0.6%. Compositions comprising more than 1% by total weight of the composition, such as 1.5% or more, can experience excessive migration of the compound to the surface of the moulded article and cause problems like stickiness etc.

Further additives (J) may be present in the thermoplastic composition of the invention, such as one or more selected from the group consisting of a nucleating agent, a clarifier, a release agent, a plasticiser, an antioxidant, a stabiliser (such as a thermal stabiliser, a visible light stabiliser, an ultraviolet light stabiliser (such as a hindered amine light stabiliser), and an antioxidant), a colourant, a flame retardant, a lubricant (such as calcium stearate), a synergist, a mould release agent, a flow enhancer, an anti-static agent, a glass filler, a filler that is different from the glass filler (such as talc), a scratch resistant additive (such as a silicone, a low density polyethylene that can be a long chain branched low density polyethylene). Combinations of these additives may also be employed.

The one or more additives can be present in an amount of 0.5-20% by total weight of the composition, preferably 2-15 wt. %. In further embodiments, the one or more additives may be present in an amount of 0-10% by total weight of the composition, such as 2-10%.

Specifically mentioned other optional additives include colourants, such as carbon black or pigments. The colourant can be present in an amount of 0.1-5% by total weight of the composition, such as 0.5-4%.

Stabilisers including, for example, an ultraviolet stabiliser, a visible light stabiliser, a thermal stabiliser, an antioxidant, or a combination comprising at least one of the foregoing can be present in an amount of 0.1-2% by total weight of the composition, preferably 0.2-1%, more preferably 0.3-0.8%.

Preferred embodiments of the thermoplastic composition of the invention comprise:
(A) 10-40% by total weight of the composition of glass fibres, preferably 20-30%, such as 20-25%;
(B) 23-44% by total weight of the composition of a propylene homopolymer matrix phase, preferably 24-43%;
(C) 1.5-26% by total weight of the composition of an ethylene-propylene copolymer dispersed phase, preferably 3-18%, such as 5-13%;
(D) 11-46% by total weight of the composition of a mixture of elastomers, said mixture comprising an ethylene/$C_{5-8}$ α-olefin copolymer and an ethylene/$C_{3-4}$ α-olefin copolymer, preferably 14-40%, such as 17-35%;
(E) 0-15% by total weight of the composition of a heterophasic polypropylene copolymer having a melt flow index of 50 g/10 min or more as measured at 190° C. under 2.16 kg force according to ISO 1133, preferably 2-12%, such as 3-10%;
(F) 0-5% by total weight of the composition of a modified polypropylene;
(G) 0-6% by total weight of the composition of silicone particles, preferably 0.5-5%, such as 0.7-4%;
(H) 0-10% by total weight of the composition of polysiloxane, preferably 0.2-5%, such as 0.2-1%;
(I) 0-1% by total weight of the composition of a fatty acid amide, preferably 0.1-1%, such as 0.1-0.6%.
(J) 0-20% by total weight of the composition of one or more additives, preferably 2-15%, such as 2-10%.

The thermoplastic composition can be made, for example, by mixing all of the components in an extruder, to obtain the composition in pellet or granule form or the composition can be formed by mixing all of the components minus the glass filler in an extruder, to obtain the composition in pellet or granule form and subsequently mixing the glass filler. The composition can also be made by blending different pellets of different compositions. The composition prior to the addition of the glass filler can have a melt flow index of 0.1-100 g/10 min as measured at 230° C. under 2.16 kg force according to ISO 1133, preferably 5-40 g/10 min, such as 5-20 g/10 min.

An article made from the thermoplastic composition can have a parallel notched Izod impact value as determined according to ISO 180/4A (2000) at 23° C. of 25 kJ/m² or more, preferably 30 kJ/m² or more. An article made from the composition can have a perpendicular notched Izod impact value as determined according to ISO 180/4A (2000) at 23° C. of 20 kJ/m² or more, preferably 29 kJ/m² or more (perpendicular).

An article made from the thermoplastic composition can have a parallel notched Izod impact value as determined according to ISO 180/1A (2000) of 20 kJ/m² or more, preferably 28 kJ/m² or more as measured at 23° C. and/or of 15 kJ/m² or more, preferably 20 kJ/m² or more as measured at 0° C. and/or of 8 kJ/m² or more, preferably 12 kJ/m² or more as measured at −20° C.

An article made from the thermoplastic composition can have a flexural modulus as determined according to ASTM D790 Procedure B measured at 23° C. of 1000 N/mm² or more, preferably 1800 N/mm² or more (parallel) and/or 800 N/mm² or more, preferably 1000 N/mm² or more (perpendicular). Sample dimensions for determining flexural moduli were 65×12.7×3.2 mm with a support span L of 51 mm.

An article made from the thermoplastic composition can have a gloss as determined according to ISO 2813 taken at 23° C. of 20 or less, preferably 10 or less as determined at an angle of 20° and/or 45 or less, preferably 30 or less as determined at an angle of 60° and/or 75 or less, preferably 60 or less at determined at an angle of 85°.

An article made from the thermoplastic composition with a Volkswagen (VW) texture K59 can have a scratch resistance value as measured according to PV 3952 2002 scratch method of VW AG company on an Erichsen scratching device with a load of 10 N of a dL of 1.5 or less, preferably 0.5 or less.

An article moulded from the thermoplastic composition can be used in applications where aesthetic aspects (such as visible and/or tactile aspects) are important. Such applications can be used as parts for automotive exterior and interior applications, or electrical appliances. Examples of automotive parts include bumper fascia, instrument panels, consoles, interior trim parts, door panels, door grips (e.g. interior), shift boot, and dashboard.

All references cited herein are hereby completely incorporated by reference to the same extent as if each reference were individually and specifically indicated to be incorporated by reference and were set forth in its entirety herein.

The use of the terms "a" and "an" and "the" and similar referents in the context of describing the invention (especially in the context of the claims) are to be construed to cover both the singular and the plural, unless otherwise indicated herein or clearly contradicted by context. The terms "comprising", "having", "including" and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention. For the purpose of the description and of the appended claims, except where otherwise indicated, all numbers expressing amounts, quantities, percentages, and so forth, are to be understood as being modified in all instances by the term "about". Also, all ranges include any combination of the maximum and minimum points disclosed and include and intermediate ranges therein, which may or may not be specifically enumerated herein.

Preferred embodiments of this invention are described herein. Variation of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject-matter recited in the claims appended hereto as permitted by applicable law. Moreover, any combination of the above-described elements in all possible variations thereof is encompassed by the invention unless otherwise indicated herein or otherwise clearly contradicted by context. The claims are to be construed to include alternative embodiments to the extent permitted by the prior art.

For the purpose of clarity and a concise description features are described herein as part of the same or separate embodiments, however, it will be appreciated that the scope of the invention may include embodiments having combinations of all or some of the features described.

The invention will now be further illustrated by the following non-limiting examples.

EXAMPLES

Melt Flow Index
The melt flow index was measured according to ISO 1133 with a load of 2.16 kg at 230° C.
Ash Content
The ash content was determined according to ISO 3451 as measured after 15 minutes at 525° C.
Notched Izod Impact Strength
Notched Izod impact strength was determined according to ISO 180/1A (II) on notched samples of 80×10×4 mm at 23° C. and −20° C.
Tensile Modulus
Tensile modulus was measured according to ISO 527/1A at 1 mm/min and 23° C. Test specimens as described in EN ISO 1873-2 (80×10×4 mm) were used.
Soft-touch Performance
Soft-touch performance was determined by a panel of 9 experts in soft touch properties. Specifically, the experts felt the surface of the respective compositions and assigned it a haptic rating − − − to +++, where a haptic rating of +++ was the best and − − − was the worst.
Tiger-stripe performance
Samples of the compositions were injection moulded into two types of ruler-shaped test specimens. Two types of moulds were used, a so-called fan gate mould and a so-called pin-point gate mould. The molten polyolefin composition was extruded through a nozzle having an upper end having a diameter of 4 mm and a lower end having a diameter of 7 mm. The lower end of the nozzle merges with a rectangular channel of the mould.

Along the length of the fan gate mould, the width changes from about 6.5 mm to 30 mm and the thickness changes from about 3 mm to 2 mm. After the fan shaped part, an elongated part follows having a width of 30 mm and a thickness of 3 mm. The rectangular part is about 34 mm in length. The fan shaped part of the mould is about 225 mm in length.

The pin-point gate mould is identical to the fan gate except that the rectangular part comprises a portion having a width of 1.2 mm over a length of about 6 mm.

The melt temperature during the injection moulding is set at 200° C., 230° C., or 260° C., respectively, and the mould is kept at room temperature. Three different screw speeds are used according to the following conditions.

| Condition | Screw speed injection [mm/s] | Flow rate [cm³/s] | Injection time [s] |
|---|---|---|---|
| Low speed | 20 | 14.1 | 2.49-2.51 |
| Medium speed | 50 | 35.3 | 0.99-1.0 |
| High speed | 160 | 113.1 | 0.38-0.39 |

Specimens having a smooth side and a textured side were manufactured. After moulding each of the specimens is visually observed for occurrence of tiger stripes on its smooth side and on its textured side. The quality of the surface was evaluated on a scale of 1 to 10, 10 being the best performance.

| | |
|---|---|
| 1 | very sharp transition between glossy and dull sections visible seen from any angle |
| 2 | sharp transitions between glossy and dull sections seen from any angle |
| 3 | very visible transitions between glossy and dull sections seen from any angle |
| 4 | visible transitions between glossy and dull sections seen from any angle |
| 5 | less visible transitions between glossy and dull sections seen from any angle |
| 6 | visible transitions between glossy and dull sections seen from a specific angle only |
| 7 | less visible transitions between glossy and dull sections seen from a specific angle only |
| 8 | no transitions between glossy and dull sections visible and surface appearance inhomogeneous |
| 9 | no transitions between glossy and dull sections visible and surface appearance homogeneous |
| 10 | no transitions between glossy and dull sections visible and surface is perfect |

The average tiger stripe rating is defined as the numerical average of the individual tiger stripe ratings for each of the test specimens manufactured at low, medium and high speed, manufactured with the pin-gate and the fan-gate and measured on the smooth and on the textured surface. Hence, the average tiger stripe rating as defined herein is the average of 12 individual tiger stripe measurements.

Compositions as defined in table 1 were prepared by blending the different components together in the indicated amounts. With the resulting compositions parts were prepared by injection moulding, which were subsequently analysed for various properties, as shown in table 2.

It is clear from table 2 that the compositions of the invention result in an improvement of the soft-touch performance and of the tiger stripe performance. Moreover, the mechanical properties of the parts obtained by the composition of the invention are excellent.

TABLE 1

| | Comparative example | Inventive example 1 | Inventive example 2 |
|---|---|---|---|
| Heterophasic polypropylene copolymer having a melt flow index of more than 50 g/10 min [wt. %] | | 5 | 8 |
| Heterophasic polymer with 18.5 wt. % of ethylene-propylene copolymer dispersed in a propylene homopolymer [wt. %] | 10 | 10 | 10 |
| Heterophasic polymer with 24 wt. % of ethylene-propylene copolymer dispersion in a propylene homopolymer [wt. %] | 31.4 | 26.4 | 23.4 |
| Copolymer of ethylene and 1-butene [wt. %] | | 8 | 12 |
| Copolymer of ethylene and 1-octene [wt. %] | 25 | 17 | 13 |
| Glass fibres [wt. %] | 25 | 25 | 25 |
| Talc filler [wt. %] | 0.5 | 0.5 | 0.5 |
| Silicone particles [wt. %] | 1 | 1 | 1 |
| Polysiloxane [wt. %] | 1 | 1 | 1 |
| Fatty acid amide [wt. %] | 0.1 | 0.1 | 0.1 |
| Additives [wt. %] | 6 | 6 | 6 |
| Total | 100 | 100 | 100 |

TABLE 2

| | Comparative example | Inventive example 1 | Inventive example 2 |
|---|---|---|---|
| Melt flow index [dg/min] | 9.1 | 8.3 | 8.2 |
| Ash content [%] | 27.6 | 27.6 | 27 |
| Izod ISO 180/1A (II) at 23° C. [kJ/m²] | 35 | 33 | 34 |
| Izod ISO 180/1A (II) at −20° C. [kJ/m²] | 15.7 | 15.3 | 16.8 |
| Tensile ISO 527/1A at 23° C. [N/mm²] | 2810 | 3193 | 3069 |
| Soft-touch performance | + | ++ | +++ |
| Tiger-stripe performance | | | |
| at 200° C., ↑ inj. speed; textured, - | 7 | 7 | 7 |
| at 200° C., ↑ inj. speed; textured, • | 7 | 8 | 7 |
| at 230° C., ↑ inj. speed; textured, - | 6 | 7 | 7 |
| at 230° C., ↑ inj. speed; textured, • | 6 | 6 | 7 |
| at 260° C., ↑ inj. speed; textured, - | 7 | 7 | 8 |
| at 260° C., ↑ inj. speed; textured, • | 7 | 7 | 8 |

-: fan gate
•: pin point

The invention claimed is:

1. A thermoplastic composition comprising,
   (A) 10-40% by total weight of the composition of glass fibres;
   (B) 22-46% by total weight of the composition of a propylene homopolymer matrix phase;
   (C) 1.5-26% by total weight of the composition of an ethylene-propylene copolymer dispersed phase; and
   (D) 11-46% by total weight of the composition of a mixture of elastomers, said mixture comprising an ethylene/$C_{5-8}$ α-olefin copolymer and an ethylene/$C_{3-4}$ α-olefin copolymer.

2. A thermoplastic composition according to claim 1, wherein said ethylene-$C_{5-8}$ α-olefin copolymer is an ethylene/$C_{6-8}$ αolefin copolymer.

3. A thermoplastic composition according to claim 1, wherein said ethylene/$C_{3-4}$ α-olefin is copolymer of ethylene and 1-butene.

4. A thermoplastic composition according to claim 1, wherein the ethylene/$C_{5-8}$ α-olefin copolymer and the ethylene/$C_{3-4}$ α-olefin copolymer are present in a weight ratio of 5:1 to 1:1.

5. A thermoplastic composition according to claim 1, wherein said propylene homopolymer phase (B) and said ethylene propylene copolymer dispersed phase (C) are a homopolymer-based matrix phase and a dispersed elastomeric phase of a heterophasic polypropylene copolymer.

6. A thermoplastic composition according to claim 1, wherein the elastomers in the mixture (D) are different from the ethylene-propylene copolymer dispersed phase (C).

7. A thermoplastic composition according to claim 1, further comprising (E) a heterophasic polypropylene copolymer having a melt flow index of 50 g/10 min or more as measured at 190° C. under 2.16 kg force according to ISO 1133.

8. A thermoplastic composition according to claim 1, wherein the elastomers in the mixture have a density of 850-880 kg/m$^3$ and a melt flow index of 0.5-35 g/10 min as measured at 190° C. under 2.16 kg force according to ISO 1133.

9. A thermoplastic composition according to claim 1, wherein the glass fibres have a filament diameter of 10-20 μm.

10. A thermoplastic composition according to claim 1, further comprising (F) a modified polypropylene, wherein said modified polypropylene is a polypropylene grafted with one or more selected from the group consisting of a carboxylic acid or salts thereof, an anhydride, and an ester.

11. A thermoplastic composition according to claim 1, further comprising (G) a silicone particle having the formula (I)

$$R_xSiO_{2-(x/2)} \qquad (I)$$

wherein x is a positive number greater than or equal to 1, and each R is independently an aliphatic hydrocarbon group, or an aromatic hydrocarbon group.

12. A thermoplastic composition according to claim 1, further comprising (H) a polysiloxane, wherein said polysiloxane comprises an ultra high molecular weight polysiloxane with a kinematic viscosity of 10×10$^6$ cSt or more as determined in accordance with ASTM D445 at 25° C.

13. A thermoplastic composition according to claim 1, further comprising 0.1-2% by total weight of the composition of one or more selected from the group consisting of a thermal stabiliser, a UV stabiliser, a visible light stabiliser, and an antioxidant.

14. An article made from a thermoplastic composition according to claim 1.

15. An article according to claim 14, in the form of one or more selected from automotive exterior parts, bumper fascia, door panels automotive interior parts, instrument panels, consoles, interior trim parts, door grips, shift boot, dashboard, and parts for electrical appliances.

16. A thermoplastic composition according to claim 1,
wherein said ethylene-C$_{5-8}$ α-olefin copolymer is an ethylene/C$_{7-8}$ α-olefin copolymer, and
wherein the ethylene/C$_{5-8}$ α-olefin copolymer and the ethylene/C$_{3-4}$ α-olefin copolymer are present in a weight ratio of 3:1 to 1:1.

17. A thermoplastic composition according to claim 16,
wherein said ethylene-C$_{5-8}$ α-olefin copolymer is a copolymer of ethylene and 1-octene; and
wherein the ethylene/C$_{5-8}$ α-olefin copolymer and the ethylene/C$_{3-4}$ α-olefin copolymer are present in a weight ratio of 2:1 to 1:1.

* * * * *